Jan. 17, 1967  J. B. SMITH  3,298,398
PLUGGING APPARATUS FOR PIPE LINES
Filed Feb. 7, 1964  3 Sheets-Sheet 1
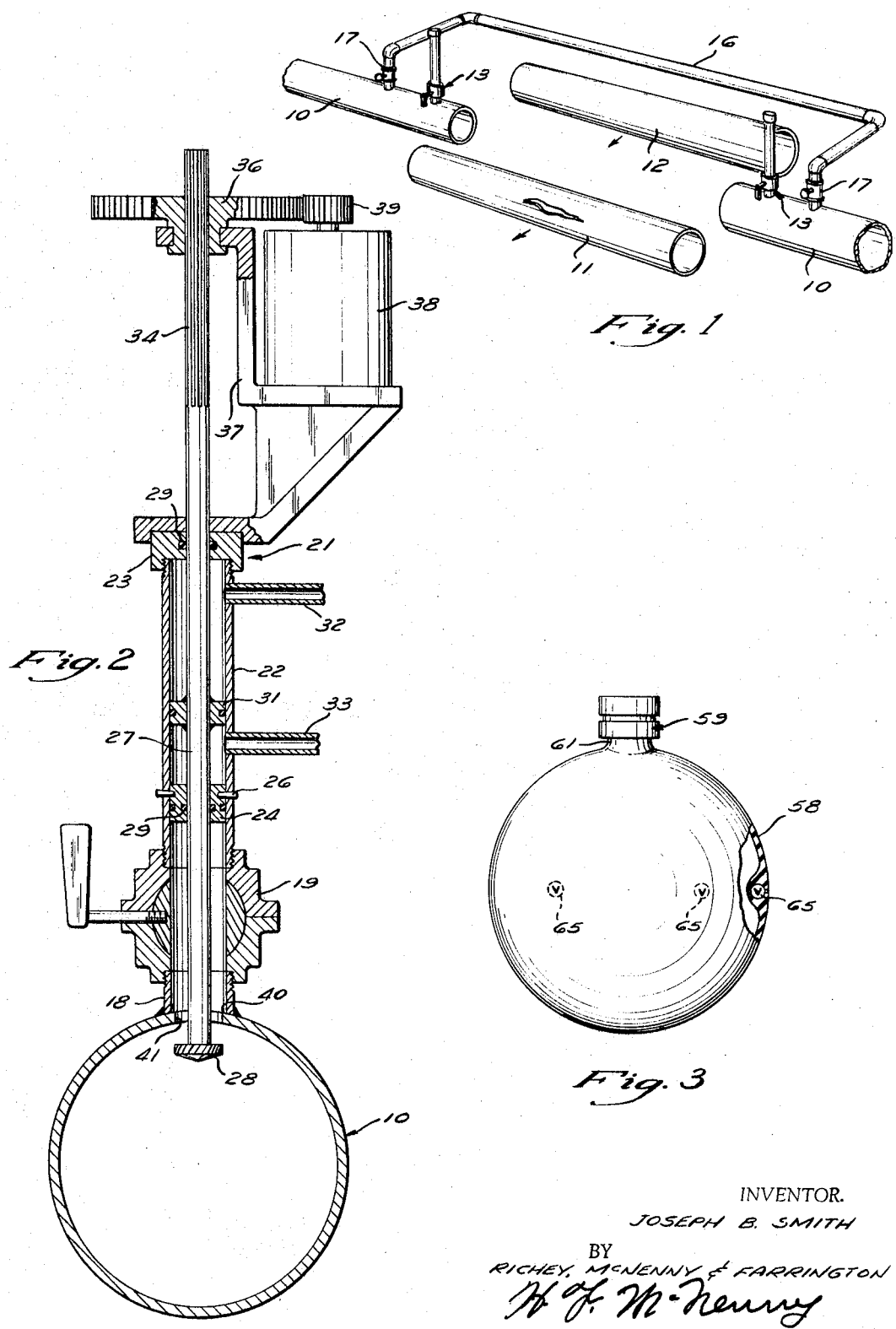
INVENTOR.
JOSEPH B. SMITH
BY
RICHEY, McNENNY & FARRINGTON
W. F. McNenny
ATTORNEYS

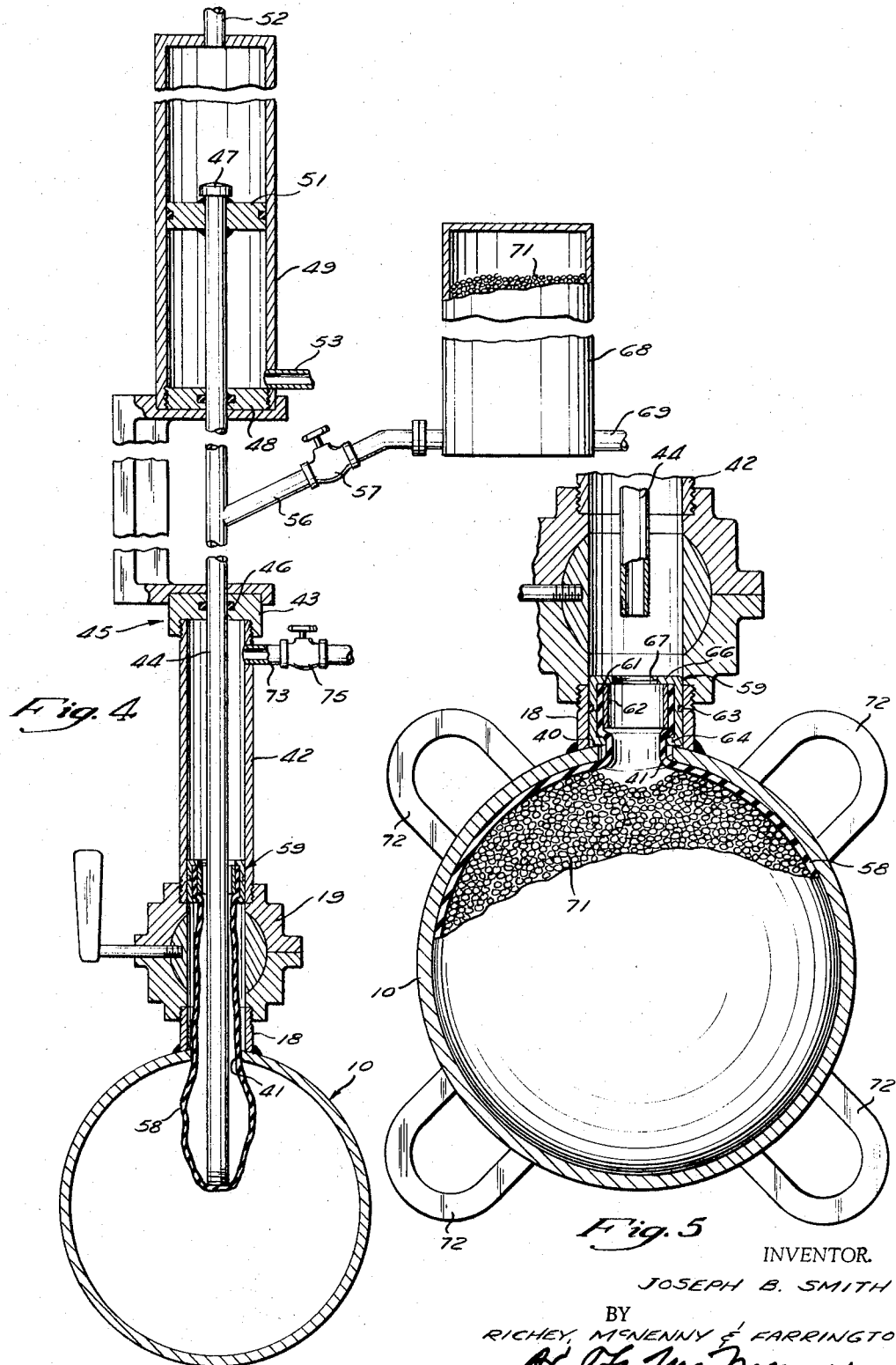

Jan. 17, 1967     J. B. SMITH     3,298,398
PLUGGING APPARATUS FOR PIPE LINES
Filed Feb. 7, 1964     3 Sheets-Sheet 3

INVENTOR.
JOSEPH B. SMITH
BY
RICHEY, McNENNY & FARRINGTON
H. F. McNenny
ATTORNEYS

United States Patent Office 3,298,398
Patented Jan. 17, 1967

3,298,398
PLUGGING APPARATUS FOR PIPE LINES
Joseph B. Smith, 5350 W. 130th St.,
Cleveland, Ohio 44125.
Filed Feb. 7, 1964, Ser. No. 343,293
19 Claims. (Cl. 138—94)

This invention relates generally to plugging devices and more particularly to an apparatus for plugging pipe lines or the like for repair or testing of such pipe lines.

It is often necessary to plug pipe lines so that a section of the pipe line may be isolated in order to conduct repairs on such section. Also, it is often necessary to plug off a pipe line to isolate a section for hydrostatic testing of the section. In either case the plugging apparatus must be capable of providing a seal with the inner wall of the pipe line and also be capable of withstanding the pressure of the fluid in the pipe line.

Many pipe lines are large, having diameters of thirty inches or more, and operate at relatively high pressures. Therefore, a plugging apparatus is often subjected to very high forces. As a result past plugging apparatus has been large, heavy and expensive to use.

A plugging apparatus incorporating this invention utilizes a bag substantially filled with loose particles or balls formed of a magnetic material in combination with means which generate a magnetic field passing through the bag. The loose particles or balls are effectively locked against movement relative to each other by the magnetic field and the entire plug structure is locked against movement along the pipe line under the influence of the pressure therein by the magnetic field. The magnetically locked particles form the rigid mass extending across the pipe so that the bag containing the particles is supported against the pressure of the fluid in the pipe line. Therefore, the bag merely operates as a gasket once the plug is installed. Also, the magnetic field causes the magnetic particles to urge the bag into tight sealing engagement with the inner wall of the pipe so a superior seal results.

The bag is collapsible and is inserted or removed from the pipe while it is empty. Therefore, the bag is inserted or removed through a relatively small lateral opening in the pipe line. Since the lateral opening is small when compared to the diameter of the pipe line the apparatus for cutting the hole in the pipe line and the fittings and accessory equipment are not excessively large. As a result, the cost of the equipment and the operating costs are substantially minimal.

It is an important object of this invention to provide a novel and improved pipe line plugging method and apparatus suitable for sealing against substantial pressures without requiring large lateral ports for the insertion or removal of the apparatus.

It is another important object of this invention to provide a novel and improved pipe line plugging method and apparatus wherein the plug is formed of loose particles magnetically locked against movement relative to each other to form a substantially rigid plug for the pipe line.

It is still another object of this invention to provide a novel and improved pipe line plugging apparatus including a collapsible bag containing magnetic particles wherein a magnetic field is applied to the particles to magnetically lock such particles against relative movement forming a rigid plug within the pipe line which supports the bag and urges the bag into said tight sealing engagement with the inner wall of the pipe line.

It is still another object of this invention to provide a novel and improved pipe line plugging apparatus including means for inserting a collapsible bag into the pipe line through a lateral opening, means to fill the bag with loose magnetic particles and magnetic means operable to magnetically lock the particles within the bag to produce a rigid plug fixed within the pipe line.

It is still another object of this invention to provide a novel and improved pipe line plugging apparatus insertable into and removable from the pipe lines through a lateral opening which is substantially smaller in diameter than the diameter of the pipe line and which is operable to seal the pipe line against substantial pressures.

Further objects and advantages will become apparent from the following description and drawings wherein:

FIGURE 1 is a fragmentary perspective view schematically illustrating one use of a plugging apparatus according to this invention wherein a damaged section of the pipe line is isolated and removed and a repair section is positoned for installation;

FIGURE 2 is a side elevation partially in longitudinal section illustrating the structure of the apparatus for cutting a hole into the side of the pipe line preparatory for the insertion of the plug;

FIGURE 3 is a side elevation partially in section illustrating the bag for plugging the pipe line;

FIGURE 4 is a side elevation partially in longitudinal section illustrating the insertion of the bag into the pipe line;

FIGURE 5 is an enlarged fragmentary section of the installed plugging apparatus wherein permanent magnets are used to produce the magnetic field for locking the plug in position;

FIGURE 1 illustrates one use of a plugging apparatus incorporating this invention, however; it should be understood that this illustration is only intended by way of example and is not intended to limit this invention to such single use.

Figure 7:
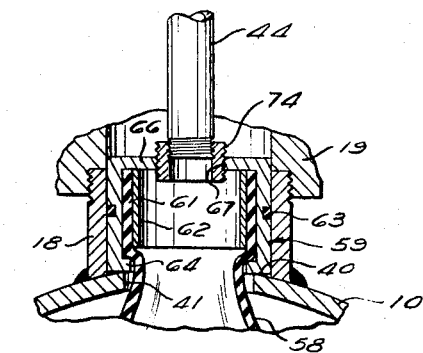
FIGURE 7 is an enlarged fragmentary section illustrating the coupling for removal of the bag.

When a section of pipe line becomes damaged it is often necessary to remove the damaged section and replace it with a repair section while maintaining the pipe line in service. In order to permit the removal of the damaged section and the installation of the repair section it is necessary to isolate the damaged section of pipe line from the remaining portions.

In FIGURE 1 a a pipe line 10 is illustrated having a damaged section 11 which is removed to permit the replacement thereof by a repair section 12. A plugging apparatus 13 is installed in the pipe line 10 at spaced points on either side of the damaged section. In the illustrated example a by-pass line 16 is connected to the pipe line 10 upstream from the first plugging apparatus 13 and downstream from the second plugging apparatus 13 so that fluid may flow through the by-pass line during the repair operation. The by-pass line 16 is provided with shut off valves 17 so that the by-pass may be removed after the repairs are completed.

Referring now to FIGURE 2, the first operation of the installation of the plugging apparatus is the installation of a nipple 18 on the outside of the pipe line 10 and the mounting of a ball valve 19 having a clear open passage equal to the inner diameter of the nipple 18. The nipple 18 may be welded in position or a split tapping saddle having a nipple may be mounted on the pipe. Because the bag which constitutes a principal portion of the plugging apparatus is collapsible the diameter of the nipple 18 can be substantially smaller than the diameter of the pipe line 10.

After the ball valve 19 is installed a drilling assembly 21 is mounted on the upper opening of the ball valve. The drilling assembly 21 includes a pipe 22 threaded into the upper opening of the ball valve 19 and closed on its upper end by a gland member 23. An internal gland 24 is mounted within the pipe 22 by lock pins 26 at a position spaced from the ends of the pipe 22. A drill rod 27 extends through the glands 23 and 24 and is provided with a cutter 28 at its end. The surface of the drill rod along the portion thereof extending from the cutter 28 through the glands 23 and 24 is smooth so that seals 29 on the glands prevent leakage along the drill rod. A piston head 31 is mounted on the drill rod 27 between the glands 23 and 24 cooperating therewith and with the pipe to form a feed actuator for raising or lowering the drill rod. Pressure lines 32 and 33 are adapted to be connected to a suitable source of pressure through a control valve (not shown) to supply pressure above or below the piston head 31 to raise and lower the drill rod 27 as required.

The upper end of the drill rod 27 is formed with a spline 34 which meshes with an internal spline formed in a drive gear 36 which is in turn journaled on a bracket 37 mounted on the gland 23. A drill motor 38 is also mounted on the bracket 37 and is provided with a pinion 39 meshing with the drive gear 36. Operation of the drill motor 38, which preferably is an air motor, therefore rotates the drive gear 36 and through the spline connection rotates the drill rod 27.

In operation the drill assembly 21 is installed on the ball valve 19, and with the ball valve open, the drill rod 27 is rotated by the drill motor 38 while downward feeding is provided by pressure supplied through the pressure line 32. When the cutter 28 engages the wall of the pipe line it cuts an opening 41 therethrough. Preferably, the opening 41 has a diameter slightly less than the internal diameter of the nipple 18 so a shoulder 40 is provided around the opening within the nipple 18. Loss of fluid within the pipe line 10 will not occur when the cutter 28 breaks through the wall of the pipe line since the gland 24 prevents such flow.

After the opening 41 is cut in the pipe line 10 pressure is supplied to the lower side of the piston head 31 through the pressure line 33 while the pressure line 32 is exhausted. This raises the drill rod 27 and carries the cutter up to a position above the ball valve 19. The ball valve 19 is then closed to seal the pipe line 10 and the drilling apparatus 21 is removed.

After the drilling assembly is removed with the ball valve 19 closed to prevent leakage from the pipe line, an assembly 45 illustrated in FIGURE 4 is installed. This assembly includes a pipe 42 threaded into the upper end of the ball valve 19 and closed at its upper end with a gland 43. A pipe 44 extends through a seal 46 in the glands 43 and is closed at its upper end by a cap 47. The upper end of the pipe 44 extends through a gland 48 in a cylinder 49 and is provided with a piston 51 which cooperates with the cylinder 49 to form a piston-cylinder actuator. Pressure line 52 and 53 connect to the opposite ends of the cylinder 49 to a source of pressure through a control valve (not shown). Thus, when pressure is applied to the pressure line 52 the piston 51 carries the pipe 44 downward and when pressure is supplied to the line 53 the pipe 44 is carried upward. After the assembly 45 is installed, the ball valve 19 may be opened to allow access for the pipe 44 and the seal 46 prevents leakage along the pipe so the system is sealed.

Figure 8:
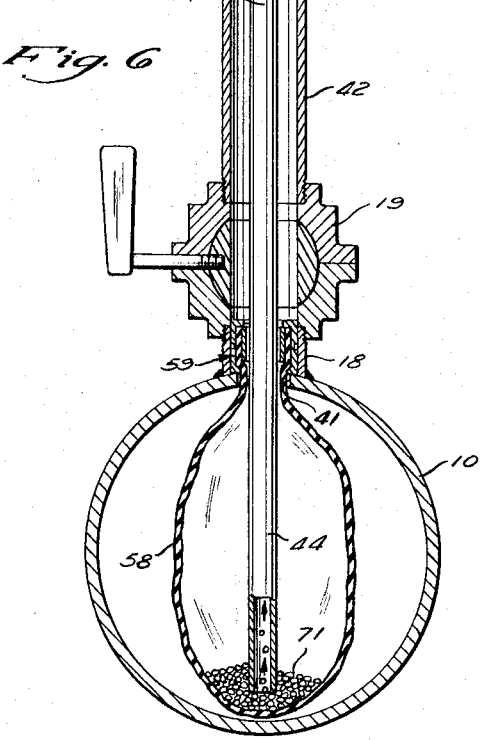
FIGURE 8 is a fragmentary section of the cleaning device used to remove chips or the like from the area to be plugged.

Normally, the first operation after installing the assembly 45 is the cleaning of the pipe 10 to remove any chips or other foreign matter which may have accumulated on the lower side of the pipe 10. For this purpose a cleaning head 54, illustrated in FIGURE 8, is threaded onto the lower end of the pipe 44. The pipe 44 is then lowered to bring the cleaning head 54 into the vicinity of the bottom of the pipe 10. A branch line 56 (illustrated in FIGURE 4) connects with the pipe 44 and is provided with a valve 57. During cleaning the outlet of the valve 57 is either open to atmosphere pressure or to a suction line. When the cleaning head 54 is adjacent to the bottom of the pipe the valve 57 is opened and foreign matter is carried up the pipe 44 and out through the valve 57. If pipe line pressure is not high enough to create sufficient flow the valve 57 may be connected to the vacuum side of a pump. In some instances pressure rather than vacuum may be used to blow the foreign matter away, allowing it to move to other areas of the pipe line.

After the pipe 10 is cleaned pressure is supplied to the pressure line 53 and the pipe 44 is lifted clear of the ball valve 19 which is then closed. The gland 43 is then removed so that the cleaning head 54 can be removed from the end of the pipe 44.

In the next operation a bag 58 formed of flexible material, preferably rubber, is installed. Referring to FIGURES 3 and 5, the bag 58 is preferably spherical in shape and is provided with an end fitting 59 clamped to the neck 61 of the bag by an expansion ring 62. The diameter of the end fitting 59 is proportioned to closely fit the inner wall of the pipe 42 and the nipple 18 and a seal 63 on the outer surface of the end fitting provides a fluid tight joint therebetween. The lower end of the fitting 59 is formed with a shoulder 64 adapted to seat against the shoulder 40 around the opening 41, as illustrated in FIGURE 5.

An inwardly extending flange 66 is formed on the upper end of the end fitting 59 and defines a threaded opening 67 proportioned to permit passage of the pipe 44 with clearance. A plurality of check valves 65 are provided in the wall of the bag 58 to permit flow only in a direction out of the bag thus preventing excessive pressures from building up within the bag.

The bag is placed within the pipe 42 while the ball valve 19 is closed and the pipe 44 is lowered to carry the bag down along the pipe and prevent it from bunching up. As soon as the end fitting 59 is within the pipe 44 the gland 43 is again replaced and the ball valve 19 is opened. Sufficient pressure is supplied through a pressure line 73 in the pipe 42 to at least equal to the pressure within the pipe line 10 so that the bag will be free to be carried down into the pipe line 10 by the lowering of the pipe 44. The piston and cylinder actuator connected to the upper end of the pipe 49 supplies the power. By carefully lowering the pipe 44 and adjusting the pressure admitted through the line 73 the bag 58 is pushed down into the pipe line 10 until the end fitting 59 engages the shoulder 40 and is below the ball valve 19.

A container 68 is then connected to the valve 57 and to a source of pressure through a pressure line 69. The container 68 is filled with magnetic particles 71. Preferably, the particles 71 are iron balls but other shapes may be used and other materials may be used so long as the material is magnetic and is shaped so that they will not damage the bag 58. Pressure is applied through the line 69 which carries the particles 71 through the valve 57 and down the pipe 44 into the bag 58. During that process the lower end of the pipe 44 is positioned below the flange 66. The fluid under pressure used to carry the particles 71 also inflates the bag 58 with excess pressure escaping through the check valves 65 or through the line 73. A valve 75 on the line 73 controls flow therethrough.

After the bag 58 is filled with the magnetic particles 71 a magnetic field is applied with sufficient intensity to magnetically lock the particles 71 against movement relative to each other. Therefore, the particles form a rigid plug. Also, the magnetic field causes the particles 71 to press the bag 58 tightly against the inner wall of the pipe line 10 to form a fluid tight seal therewith. Because the particles 71 form a rigid mass the bag 58 is supported against the pressure in the pipe line and merely serves as a gasket or seal with the magnetic particles supporting the pressure. Also, the magnetic field prevents the pressure differential across the bag from carrying the plug downstream. The downstream check valves 65 permit the pressure in the bag to approach the downstream pressure, which may be atmospheric pressure. However, the bag is supported by the magnetically locked particles so it is not subjected to high strains.

In the illustrated embodiment the magnetic field is produced by a series of strong permanent magnets 72 positioned around the pipe 10, however, other means of inducing the magnetic field may be utilized, such as an electric coil wrapped around the pipe or electric magnets of any suitable type. The pipe 44 is lifted clear of the gate valve 19 which is closed completing the plugging operation.

Figure 6:
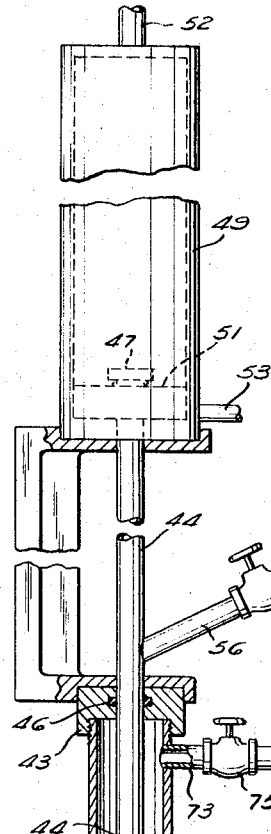
FIGURE 6 is a side elevation partially in longitudinal section illustrating the removal of the magnetic particles when the plug is to be removed.

After the repairs or other tests which must be performed are completed the plugs are removed to place the pipe line in normal operation. The type of removal operation which may be used is illustrated in FIGURE 6. The magnets 72 are removed to eliminate the magnetic field and the magnetic particles are then removed from the bag 58. Before removing the magnetic field the pressure on the two sides of the plug should be equalized. This may be accomplished by supplying pressure to the bag through the valve 75. When the pressure in the bag is greater than the downstream pipe line pressure flow occurs through the check valves 65 to build up the pressure in the isolated section. If the isolated section is long a by-pass may be installed to equalize pressure. In the illustrated embodiment the magnetic particles 71 are removed by connecting the pressure lines 69 to exhaust while pressure is supplied to a pressure line 73 in the upper end of the pipe 42. The container 68 is turned over so that its connection with the valve 57 is at the top of the container, as illustrated in FIGURE 6.

The pressure supplied through the line 73 passes down along the pipe 42 around the pipe 44 and through the opening 67 into the bag 58. This causes a higher pressure to exist in the bag than within the pipe 44 and causes the magnetic particles 71 to be entrained and carried up the pipe 44 through the valve 57 and into the container 68. Because the velocity of flow is sharply decreased within the container the particles drop and remain in the container 68.

After the magnetic particles 71 are removed from the bag the pipe 44 is raised clear of the ball valve 19 which is then closed. The gland 43 is then removed and a threaded fitting is placed on the lower end of the pipe 44. This fitting is proportioned to thread into corresponding threads in the opening 67. After the threaded fitting 74 is mounted on the end of the pipe 44 the gland 43 is again replaced and the pipe 44 is lowered through the then opened ball valve and threaded into the end fitting 59 by rotating the pipe 44. The pipe 44 is then raised to carry the bag up into the pipe 42 by supplying pressure to the line 53. Once the bag 58 is above the ball valve 19 the ball valve is closed and the assembly is removed. Normally the upper opening of the ball valve is plugged and the valve is left on the pipe line.

The magnetic particles 71 may be formed of any suitable material which becomes strongly magnetic in the presence of a magnetic field. They should not retain any substantial residual magnetism when the field is removed so that the particles are loose for filling or emptying the bag. Because the magnetic particles 71 support the bag 58 when the magnetic field is applied the bag may be formed of a relatively soft material even though relatively high pressures are sealed. Also, because the opening through which the plug is inserted into the pipe is relatively small the equipment costs and operating costs of plugging are greatly reduced.

Although a preferred embodiment of this invention is illustrated, it is to be understood that various modifications and rearrangements of parts may be resorted to without departing from the scope of the invention as defined in the following claims.

What is claimed is:
1. An apparatus for restricting hollow pipes comprising a flexible bag positioned in said pipe, a plurality of particles in said bag formed of magnetic material, and magnetic means producing a magnetic field through said particles and operating to cause said particles to become magnetically locked as a rigid mass within said pipe.

2. An apparatus for plugging hollow pipes comprising a flexible bag positioned in said pipe engaging the inner wall thereof, a plurality of particles in said bag formed of magnetic material, and magnetic means external of said pipe producing a magnetic field extending through said pipe and particles and operating to cause said particles to become magnetically locked against relative movement and to press said bag into sealing engagement with the inner wall of said pipe.

3. An apparatus for plugging hollow pipes comprising a flexible bag poistioned in said pipe engaging the inner wall thereof, a plurality of particles in said bag formed of magnetic material, and magnetic means producing a magnetic field enclosing said particles and operating to cause said particles to become magnetically locked against relative movement and to press said bag into sealing engagement with the inner wall of said pipe.

4. An apparatus for plugging hollow pipes comprising a flexible bag, a plurality of magnetic particles, means for inserting said bag through a lateral opening into said pipe, means for filling said bag with said particles, and magnetic means producing a magnetic field through said particles and operating to cause said particles to become magnetically locked against relative movement and said bag to be pressed into engagement with the wall of said pipe, said particles having a sufficiently low residual magnetism to allow them to become a loose mass when free of a separately induced magnetic field.

5. An apparatus for plugging a pipe comprising a flexible container, a mass of loose magnetic particles, means for inserting said container into said pipe and removing said container from said pipe, means for filling said container with said particles and removing said particles from said container while said container is within said pipe, and means producing a magnetic field for said particles causing such particles to become a rigid mass and said bag to be pressed into engagement with the wall of said pipe.

6. An apparatus for plugging a pipe comprising means for cutting an opening having a diameter less than the diameter of said pipe through the side wall of said pipe, means for cleaning said pipe adjacent to said opening, a flexible bag, means for inserting said flexible bag through said opening into said pipe, relief means operable to prevent excessive pressure in said bag, a mass of loose magnetic particles, means for inserting said loose magnetic particles through said opening into said bag, means operable to produce a magnetic field extending through said particles magnetically locking said particles as a rigid mass and pressing said bag into engagement with the wall of said pipe, means for removing said particles from said bag through said opening, and means for removing said bag from said pipe through said opening.

7. An apparatus for plugging a pipe under pressure comprising means for cutting an opening having a diameter less than the diameter of said pipe through the side wall of said pipe while preventing loss of pressure from said pipe, means insertable through said opening for cleaning said pipe adjacent to said opening, a flexible bag, means for inserting said flexible bag through said opening into said pipe and producing a pressure within said bag at least equal to the pressure in said pipe, relief means operable to prevent pressure in said bag substantially greater than the pressure in said pipe, a plurality of loose magnetic particles, means for inserting said loose magnetic particles through said opening into said bag, means operable to produce a magnetic field extending through said particles magnetically locking said particles as a rigid mass and pressing said bag into engagement with the wall of said pipe, means for removing said particles from said bag through said opening, and means for removing said bag from said pipe through said opening.

8. An apparatus for plugging a pipe under pressure comprising means for cutting an opening having a diameter less than the diameter of said pipe through the side wall of said pipe while preventing loss of pressure from said pipe, a valve operable to close said opening, a pressure chamber connectable with said opening through said valve, means insertable through said pressure chamber for cleaning said pipe adjacent to said opening, a flexible bag, means for inserting said flexible bag through said pressure chamber and said opening into said pipe and producing a pressure within said bag at least equal to the pressure in said pipe, relief means operable to prevent pressure in said bag substantially greater than the pressure in said pipe, a mass of loose magnetic particles, means for inserting said loose magnetic particles through said opening into said bag, means external of said pipe operable to produce a magnetic field extending through said particles magnetically locking said particles as a rigid mass and pressing said bag into engagement with the wall of said pipe, means for removing said particles from said bag, and means for removing said bag from said pipe through said opening.

9. An apparatus for plugging a pipe under pressure comprising means for cutting an opening having a diameter less than the diameter of said pipe through the side wall of said pipe while preventing loss of pressure from said pipe, a valve operable to close said opening, a pressure chamber connectable with said opening through said valve, means insertable through said pressure chamber for cleaning said pipe adjacent to said opening, a flexible bag, means for inserting said flexible bag through said pressure chamber and said opening into said pipe and producing a pressure within said bag at least equal to the pressure in said pipe, relief means operable to prevent pressure in said bag substantially greater than the pressure in said pipe, a mass of loose magnetic particles, means for inserting said loose magnetic particles through said opening into said bag, means external of said pipe operable to produce a magnetic field extending through said particles magnetically locking said particles as a rigid mass and pressing said bag into sealing engagement with the inner wall of said pipe, means for removing said particles from said bag through said opening by inducing a fluid flow through an outlet tube entraining said particles and carrying them along said tube, and means for removing said bag from said pipe through said opening.

10. A method of restricting a pipe comprising positioning a flexible impervious container in a pipe, filling said container with loose magnetic particles, and applying a magnetic field to said particles causing them to become a rigid mass within said container.

11. A method of plugging pipe comprising positioning a flexible impervious container in a pipe, filling said container with loose magnetic particles, and applying a magnetic field to said particles from external of said pipe causing said particles to become a rigid mass within said container and to press said container into sealing engagement with the wall of said pipe.

12. A method of plugging a pipe under pressure comprising cutting an opening through the wall of said pipe, cleaning said pipe in the area near said opening, inserting a flexible bag through said opening and pressurizing said bag to a pressure at least equal to the pressure in said pipe, inserting loose magnetic particles through said opening into said bag, and applying a magnetic field through said particles to press said bag into engagement with the wall of said pipe.

13. A method of plugging a pipe under pressure comprising cutting an opening through the wall of said pipe, cleaning said pipe in the area near said opening, inserting a flexible bag through said opening and pressurizing said bag to a pressure at least equal to the pressure in said pipe, inserting loose magnetic particles through said opening into said bag, applying a magnetic field through said particles to press said bag into engagement with the wall of said pipe, and thereafter removing said magnetic field, removing said particles from said bag, and removing said bag through said opening.

14. A method of plugging a pipe under pressure comprising cutting an opening having a diameter less than the diameter of said pipe through the wall of said pipe, cleaning said pipe in the area near said opening, inserting a flexible bag through said opening and pressurizing said bag to a pressure at least equal to the pressure in said pipe, inserting losse magnetic particles through said opening into said bag, applying a magnetic field through said particles from external of said pipe causing said particles to become a rigid mass and to press said bag into sealing engagement with the wall of said pipe, and thereafter removing said magnetic field, removing said particles from said bag, and removing said bag through said opening.

15. A method of plugging a pipe under pressure comprising mounting a valve on said pipe, inserting cutting means through said valve and cutting an opening having a diameter less than the diameter of said pipe through the wall of said pipe, cleaning said pipe in the area near said opening, inserting a flexible bag through said valve and opening and pressurizing said bag to a pressure at least equal to the pressure in said pipe, inserting loose magnetic particles through said valve and opening into said bag, applying a magnetic field through said particles causing said particles to become a rigid mass and to press said bag into sealing engagement with the wall of said pipe from external of said pipe, and thereafter removing said magnetic field, removing said particles from said bag, and removing said bag through said opening and valve.

16. A method of plugging a pipe under pressure comprising mounting a valve on said pipe, inserting cutting means through said valve and cutting an opening having a diameter less than the diameter of said pipe through the wall of said pipe, cleaning said pipe in the area near said opening, inserting a flexible bag through said valve and opening and pressurizing said bag to a pressure at least equal to the pressure in said pipe, inserting loose magnetic particles through said valve and opening into said bag, applying a magnetic field through said particles from external of said pipe causing said particles to become a rigid mass and to press said bag into sealing engagement with the wall of said pipe, and thereafter removing said magnetic field, removing said particles from said bag through said opening and valve, and removing said bag through said opening and valve.

17. A bag for plugging pipe comprising a flexible portion having a circular cross-section, a neck portion joining said first portion adapted to extend through a lateral opening in a pipe, and a plurality of spaced relief valves in said first portion operable to prevent pressures therein substantially higher than the pressure surrounding said first portion.

18. A bag for plugging pipe comprising a flexible first portion having a shape similar to the inner wall of said pipe, a neck portion joining said portion, means on said neck portion adapted to fit around a lateral opening in a pipe, and a plurality of spaced relief valves in said first portion operable to prevent pressures therein substantially higher than the pressure surrounding said first portion.

19. A bag for plugging pipe comprising a flexible spherical portion, a neck portion joining said spherical portion, rigid means on said neck portion adapted to fit around a lateral opening in a pipe, and a plurality of spaced relief valves in said spherical portion operable to prevent pressures therein substantially higher than the pressure surrounding said spherical portion.

References Cited by the Examiner
UNITED STATES PATENTS
1,860,855   5/1932   Gardner _____ 138—93

FOREIGN PATENTS
333,357   8/1930   Great Britain.

LAVERNE D. GEIGER, *Primary Examiner.*
T. L. MOORHEAD, *Assistant Examiner.*